US010044131B2

(12) United States Patent
Katahira et al.

(10) Patent No.: US 10,044,131 B2
(45) Date of Patent: Aug. 7, 2018

(54) ACCESSORY SOCKET STRUCTURE OF SADDLED VEHICLE

(71) Applicant: HONDA MOTOR CO., LTD., Tokyo (JP)

(72) Inventors: Masaya Katahira, Wako (JP); Kunihiro Kai, Wako (JP); Sakae Endo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/711,386

(22) Filed: Sep. 21, 2017

(65) Prior Publication Data

US 2018/0090875 A1    Mar. 29, 2018

(30) Foreign Application Priority Data

Sep. 23, 2016 (JP) ................................ 2016-186009

(51) Int. Cl.
| *H01R 13/44* | (2006.01) |
| *H01R 13/52* | (2006.01) |
| *B60R 16/03* | (2006.01) |
| *B65D 43/14* | (2006.01) |
| *B62J 23/00* | (2006.01) |
| *B62J 99/00* | (2009.01) |

(52) U.S. Cl.
CPC ......... *H01R 13/5213* (2013.01); *B60R 16/03* (2013.01); *B62J 23/00* (2013.01); *B62J 99/00* (2013.01); *B65D 43/14* (2013.01); *B62J 2099/004* (2013.01)

(58) Field of Classification Search
CPC .................................................. H01R 13/4563

USPC .......................................... 439/142, 136, 135
See application file for complete search history.

(56) References Cited

U.S. PATENT DOCUMENTS

| 4,709,123 A * | 11/1987 | Yamashita ............. H01H 9/047 174/17 VA |
| 7,033,209 B2 * | 4/2006 | Swiatek .................. B62J 99/00 439/502 |

(Continued)

FOREIGN PATENT DOCUMENTS

| EP | 2 717 389 A1 | 4/2014 |
| EP | 2 979 963 A1 | 2/2016 |

(Continued)

OTHER PUBLICATIONS

European Patent Office, Partial European Search Report Appln. No. 17192010.1, dated Jan. 26, 2018.

*Primary Examiner* — Phuong Dinh
(74) *Attorney, Agent, or Firm* — Squire Patton Boggs (US) LLP (57) ABSTRACT

A socket has an end portion at a side of an insertion port. A lid member includes a fixed portion, a coupling portion, and a lid portion. The fixed portion is covered at the end portion at the insertion port side of the socket. The coupling portion is integrally formed with the fixed portion. The lid portion is integrally formed with the coupling portion to cover the insertion port of the socket. The coupling portion includes a supporting convex portion having a thickness such that the supporting convex portion can pass through a clearance. The supporting convex portion is configured to abut on the fixed portion when the lid portion is opened, to maintain an open state of the lid portion.

14 Claims, 10 Drawing Sheets

(56) References Cited

U.S. PATENT DOCUMENTS

| | | | |
|---|---|---|---|
| 7,972,142 B2 * | 7/2011 | Swiatek | H01R 31/02 439/34 |
| 9,231,329 B2 | 1/2016 | Kojima et al. | |
| 2013/0143432 A1 * | 6/2013 | Yamashita | B60L 11/1818 439/503 |
| 2013/0194595 A1 | 8/2013 | Murata | |
| 2014/0094045 A1 | 4/2014 | Kojima et al. | |
| 2014/0345962 A1 | 11/2014 | Miyashiro | |

FOREIGN PATENT DOCUMENTS

| | | |
|---|---|---|
| JP | 2003-095170 A | 4/2003 |
| JP | 2013-155825 A | 8/2013 |
| TW | M330674 U | 4/2008 |

* cited by examiner

ACCESSORY SOCKET STRUCTURE OF SADDLED VEHICLE

CROSS-REFERENCE TO RELATED APPLICATIONS

The present application claims priority under 35 USC 119 to Japanese Patent Application No. 2016-186009 filed Sep. 23, 2016 the entire contents of which are hereby expressly incorporated by reference.

TECHNICAL FIELD

The present invention relates to an accessory socket structure of a saddled vehicle, in particular, relates to an accessory socket structure of a saddled vehicle disposed on an exterior component of a vehicle body to supply electric power to an electrical device.

BACKGROUND ART

Conventionally, an accessory socket for obtaining power source for lighting equipment, a mobile terminal, and the like used at the periphery of a vehicle from an on-vehicle battery has been known.

Patent Literature 1 discloses a structure of a saddled four-wheeled buggy. In the structure, an accessory socket is disposed on a side surface of a housing of a meter device. The saddled four-wheeled buggy includes a rod-shaped steering handlebar that extends in a vehicle width direction. At a center of the steering handlebar, the meter device is disposed.

Patent Literature 2 discloses a structure provided with a lid opened or closed by a hinge on an insertion port of an accessory socket, and incorporated with a spring member in a hinge part in order to maintain an open state or a closed state of the lid.

CITATION LIST

Patent Literature

Patent Document 1: JP 2003-095170 A
Patent Document 2: JP 2013-155825 A

SUMMARY OF INVENTION

Technical Problem

However, the accessory socket described in Patent Literature 1 has an insertion port whose lid is coupled to a main body side by a sheet-shaped coupling portion. When a plug at an electrical device side is inserted, it is necessary for a user to press the lid by hand so as not to close the lid. This problem can be dealt with through biasing by the spring described in Patent Literature 2. However, this causes a problem that this structure is not appropriate for a location exposed to moisture, sand, and the like, such as an exterior component of a saddled vehicle. When the accessory socket is disposed on a vehicle-body front portion, depending on a steering position of a steering handlebar, a lid manipulation by the user possibly becomes difficult.

It is an object of the present invention to solve the problems of the conventional technology and provide an accessory socket structure of a saddled vehicle that ensures maintenance of an open state of a lid that covers an insertion port with a simple structure, and is arranged at a position with good operability.

Solution to Problems

To achieve the afore-mentioned object, the present invention has a first feature in that an accessory socket structure of a saddled vehicle, the accessory socket structure having a bottomed cylindrical socket (S) and a lid member (40) disposed on an opening (32), the socket (S) having an insertion port (Sa) for inserting a plug at an electrical device side, the lid member (40) being mounted on the socket (S) for covering the insertion port (Sa), and the opening (32) being disposed on an exterior component (30) of a saddled vehicle (1), wherein the socket (S) has an end portion at a side of the insertion port (Sa), the end portion having a predetermined clearance (T) with an inner peripheral portion of the opening (32) to be inserted into the opening (32) from a vehicle-body lower side toward a vehicle-body upper side, the lid member (40) includes a fixed portion (50), a coupling portion (45), and a lid portion (41), the fixed portion (50) being covered at the end portion at the insertion port (Sa) side of the socket (S), the coupling portion (45) being integrally formed with the fixed portion (50), and the lid portion (41) being integrally formed with the coupling portion (45) to cover the insertion port (Sa) of the socket (S), the coupling portion (45) includes a supporting convex portion (45b) having a thickness such that the supporting convex portion (45b) can pass through the clearance (T), and the supporting convex portion (45b) is configured to abut on the fixed portion (50) when the lid portion (41) is opened, to maintain an open state of the lid portion (41).

The present invention has a second feature in that the socket (S) has an axis (0) arranged to incline rearward with respect to a vehicle-body vertical direction, and the coupling portion (45) is disposed at a position near a vehicle-body front side.

The present invention has a third feature in that the exterior component (30) is a side cowl (30) positioned at an outside in a vehicle width direction of a fuel tank (3), the side cowl (30) includes an upright wall (31) arranged upright at a position at the vehicle-body front side of the opening (32), and the upright wall (31) is formed approximately parallel to the axis (0) of the socket (S).

The present invention has a fourth feature in that the side cowl (30) has a top surface portion (30a) having a predetermined width in the vehicle width direction to incline to a vehicle-body rear and lower side, the opening (32) is disposed at the top surface portion (30a) and has a cutout (32a) that extends outside in a radial direction of a circular part, the socket (S) being inserted into the circular part, the lid portion (41) is formed into a diamond whose two sides are oriented in a vehicle-body front and rear direction when the vehicle body is seen in a plan view, and the diamond of the lid portion (41) has an acute angle part having a lower surface, the lower surface including a positioning protrusion (42a) engaged with the cutout (32a).

The present invention has a fifth feature in that the lid portion (41) is arranged such that one of the acute angle parts of the diamond is positioned at a front of an outside in the vehicle width direction, the coupling portion (45) is positioned at an obtuse angle part at an inside in the vehicle width direction of the diamond of the lid portion (41), and the positioning protrusion (42a) is positioned at a rear of the inside in the vehicle width direction.

The present invention has a sixth feature in that a side kickstand (25) is disposed at a left side in the vehicle width direction of the saddled vehicle (1), and the opening (32) is disposed at the side cowl (30) on the left side in the vehicle width direction.

The present invention has a seventh feature in that an accessory socket structure of a saddled vehicle, the accessory socket structure comprising a bottomed cylindrical socket (S) and a lid member (40), the socket (S) having an insertion port (Sa) of a plug at an electrical device side, and the lid member (40) being mounted on the socket (S) to cover the insertion port (Sa), wherein a side cowl (30) is disposed on a left side in a vehicle width direction of the saddled vehicle (1), the side cowl (30) covering a side kickstand (25) and a side portion of a fuel tank (3), when a steering handlebar (4) of the saddled vehicle (1) is at a neutral position, the socket (S) is disposed on the side cowl (30) at a position rearward of a rear end of the steering handlebar (4), ahead of a front end of a seat (23), below an upper end of the seat (23), and upward of an upper end of a front wheel (WF) when the vehicle body is viewed from the side.

The present invention has an eighth feature in that the side cowl (30) includes a top surface portion (30a) and a side surface portion (30b), the top surface portion (30a) extending in the vehicle width direction, and the side surface portion (30b) extending downward from an outer end portion in the vehicle width direction of the top surface portion (30a), the socket (S) is disposed on an opening (32) disposed at the top surface portion (30a) to be covered with the side surface portion (30b) at a side portion, and the lid member (40) is configured to simultaneously cover the insertion port (Sa) and the opening (32).

The present invention has a ninth feature in that a second distance (L2) is larger than a first distance (L1), the first distance (L1) being from a rear end of the steering handlebar (4) to a top surface portion (8a) of an exterior component (8) positioned underneath the steering handlebar (4), the first distance (L1) being established when the steering handlebar (4) is at a neutral position, and the second distance (L2) being from the rear end of the steering handlebar (4) to a top surface portion (30a) of an exterior component (30) positioned underneath the steering handlebar (4), the second distance (L2) being established when the steering handlebar (4) is steered to a left limited position.

Advantageous Effects of Invention

According to the first feature, a socket (S) has an end portion at a side of an insertion port (Sa), the end portion having a predetermined clearance (T) with an inner peripheral portion of an opening (32) to be inserted into the opening (32) from a vehicle-body lower side toward a vehicle-body upper side, a lid member (40) includes a fixed portion (50), a coupling portion (45), and a lid portion (41), the fixed portion (50) being covered at the end portion at the insertion port (Sa) side of the socket (S), the coupling portion (45) being integrally formed with the fixed portion (50), and the lid portion (41) being integrally formed with the coupling portion (45) to cover the insertion port (Sa) of the socket (S), the coupling portion (45) includes a supporting convex portion (45b) having a thickness such that the supporting convex portion (45b) can pass through the clearance (T), and the supporting convex portion (45b) is configured to abut on the fixed portion (50) when the lid portion (41) is opened, to maintain an open state of the lid portion (41). This can maintain the open state of the lid portion by the supporting convex portion formed on the coupling portion to eliminate the need for the user to support the lid portion by hand when inserting the plug at the electrical device side into the socket, thus ensuring improvement of usability of the accessory socket with the simple structure without increasing the number of components.

According to the second feature, the socket (S) has an axis (0) arranged to incline rearward with respect to a vehicle-body vertical direction, and the coupling portion (45) is disposed at a position near a vehicle-body front side. This facilitates insertion of a plug at the electrical device side into the socket by bringing the plug close to the socket from a vehicle-body rear and upper portion in a state where the lid portion is open. Inserting the plug into the socket causes the lid portion to abut on the plug at the vehicle-body front side, thus ensuring more stable maintenance of the open state of the lid portion.

According to the third feature, the exterior component (30) is a side cowl (30) positioned at an outside in a vehicle width direction of a fuel tank (3), the side cowl (30) includes an upright wall (31) arranged upright at a position at the vehicle-body front side of the opening (32), and the upright wall (31) is formed approximately parallel to the axis (0) of the socket (S). This sandwiches the opened lid portion between the plug inserted into the socket and the upright wall of the side cowl, thus ensuring reduction of shaking of the lid portion even when the accessory socket is used in travelling.

According to the fourth feature, the side cowl (30) has a top surface portion (30a) having a predetermined width in the vehicle width direction to incline to a vehicle-body rear and lower side, the opening (32) is disposed at the top surface portion (30a) and has a cutout (32a) that extends outside in a radial direction of a circular part, the socket (S) being inserted into the circular part, the lid portion (41) is formed into a diamond whose two sides are oriented in a vehicle-body front and rear direction when the vehicle body is seen in a plan view, and the diamond of the lid portion (41) has an acute angle part having a lower surface, the lower surface including a positioning protrusion (42a) engaged with the cutout (32a). This prevents rotation of the lid portion when the lid portion is closed and ensures maintenance of a clearance between the lid portion and the upright wall with the simple structure.

According to the fifth feature, the lid portion (41) is arranged such that one of the acute angle parts of the diamond is positioned at a front of an outside in the vehicle width direction, the coupling portion (45) is positioned at an obtuse angle part at an inside in the vehicle width direction of the diamond of the lid portion (41), and the positioning protrusion (42a) is positioned at a rear of the inside in the vehicle width direction. This facilitates opening of the lid portion by having a hand on the lid portion at the outside in the vehicle width direction to lift the lid portion. Moreover, forming the positioning protrusion in a direction different from an open and close direction of the lid portion causes friction resistance to be less likely to occur in opening or closing of the lid portion to improve the operability.

According to the sixth feature, a side kickstand (25) is disposed at a left side in the vehicle width direction of the saddled vehicle (1), and the opening (32) is disposed at the side cowl (30) on the left side in the vehicle width direction. This facilitates an access to the accessory socket from a vehicle-body left side, even when the saddled vehicle is stopped using the side kickstand and the vehicle body inclines to the left side.

According to the seventh feature, an accessory socket structure of a saddled vehicle, the accessory socket structure comprising a bottomed cylindrical socket (S) and a lid member (40), the socket (S) having an insertion port (Sa) of a plug at an electrical device side, and the lid member (40) being mounted on the socket (S) to cover the insertion port (Sa), wherein a side cowl (30) is disposed on a left side in a vehicle width direction of the saddled vehicle (1), the side cowl (30) covering a side kickstand (25) and a side portion of a fuel tank (3), when a steering handlebar (4) of the saddled vehicle (1) is at a neutral position, the socket (S) is disposed on the side cowl (30) at a position rearward of a rear end of the steering handlebar (4), ahead of a front end of a seat (23), below an upper end of the seat (23), and upward of an upper end of a front wheel (WF) when the vehicle body is viewed from the side. This ensures the accessory socket having the usability even when the saddled vehicle is stood by itself with the side kickstand on the left side in the vehicle width direction.

According to the eighth feature, the side cowl (30) includes a top surface portion (30a) and a side surface portion (30b), the top surface portion (30a) extending in the vehicle width direction, and the side surface portion (30b) extending downward from an outer end portion in the vehicle width direction of the top surface portion (30a), the socket (S) is disposed on an opening (32) disposed at the top surface portion (30a) to be covered with the side surface portion (30b) at a side portion, and the lid member (40) is configured to simultaneously cover the insertion port (Sa) and the opening (32). This can cover top and side portions of the socket with the side cowl without increasing the number of components. Moreover, covering the insertion port of the socket with the lid member also covers the opening of the side cowl, thus ensuring prevention of intrusion of moisture into the side cowl.

According to the ninth feature, a second distance (L2) is larger than a first distance (L1), the first distance (L1) being from a rear end of the steering handlebar (4) to a top surface portion (8a) of an exterior component (8) positioned underneath the steering handlebar (4), the first distance (L1) being established when the steering handlebar (4) is at a neutral position, and the second distance (L2) being from the rear end of the steering handlebar (4) to a top surface portion (30a) of an exterior component (30) positioned underneath the steering handlebar (4), the second distance (L2) being established when the steering handlebar (4) is steered to a left limited position. Therefore, when the vehicle body is supported by the side kickstand disposed on the vehicle-body left side, the steering handlebar is often fully steered to the left side. However, in this case, a distance between the steering handlebar and the accessory socket is largely ensured, thus ensuring satisfactory operability of the accessory socket.

DESCRIPTION OF EMBODIMENTS

Figure 1:
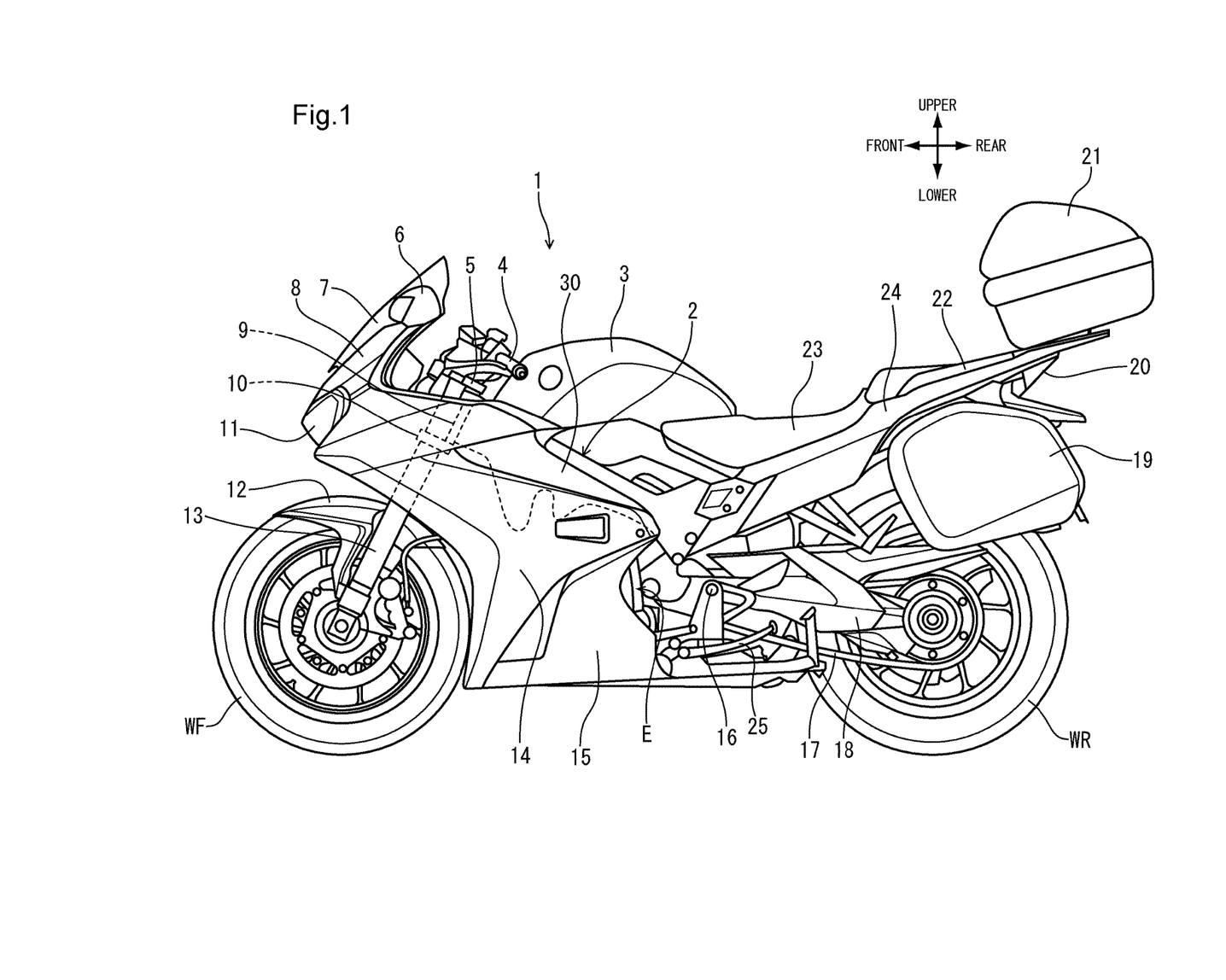
FIG. 1 is a left side view of a motorcycle to which an accessory socket of a saddled vehicle according to the embodiment is applied.

Preferred embodiments of the present invention will be described in detail below referring to the drawings. FIG. 1 is a left side view of a motorcycle 1 to which an accessory socket of a saddled vehicle according to the embodiment is applied. The motorcycle 1 is a saddled vehicle that transmits a driving power from an engine E to a rear wheel WR to travel. A right and left pair of front forks 13 are supported by a top bridge 5 and a bottom bridge 10. The front forks 13 are steerably journaled by a head tube 9 disposed on a front end of a body frame 2. A front wheel WF is rotatably journaled to lower end portions of the front forks 13. A steering handlebar 4 is mounted on an upper portion of the top bridge 5. The rear wheel WR is rotatably journaled by a swing arm 18. The swing arm 18 has a front end portion swingably journaled by a pivot 16 disposed on a rear end of the engine E. The driving power from the engine E is transmitted to the rear wheel WR via a drive chain 17. A side kickstand 25 is mounted underneath the pivot 16. The side kickstand 25 is for slightly inclining the vehicle body to the left side to stand in itself.

A front cowl 8 includes a windbreak screen 7 and a headlight 11. The front cowl 8 is disposed ahead of the steering handlebar 4. A right and left pair of center cowls 14 are coupled to a rear lower portion of the front cowl 8 as an exterior component. A right and left pair of under cowls 15 are coupled to lower end portions of the center cowls 14. A right and left pair of rearview mirrors 6 are mounted on upper portions of the front cowl 8. The rearview mirrors 6 incorporate winker devices.

A fuel tank 3 is arranged between a seat 23 and the steering handlebar 4. A seat cowl 24 is arranged on a rear lower portion of the seat 23. A passenger grip 22 and a tail lamp device 20 are disposed on a rear portion of the seat cowl 24. The passenger grip 22 is gripped by an occupant on a rear seat. On a peripheral area of the passenger grip 22 and the tail lamp device 20, a right and left pair of pannier cases 19 and a top-box 21 are mounted.

Side cowls 30 are coupled to a position at rear upper portions of the center cowls 14 and below the fuel tank 3. The side cowls 30 are a right and left pair of exterior components continuous with the center cowls 14. An accessory socket constitutes an accessory socket structure according to the present invention. The accessory socket is arranged on a top surface portion of the side cowl 30 on the left side in the vehicle width direction.

Figure 2:
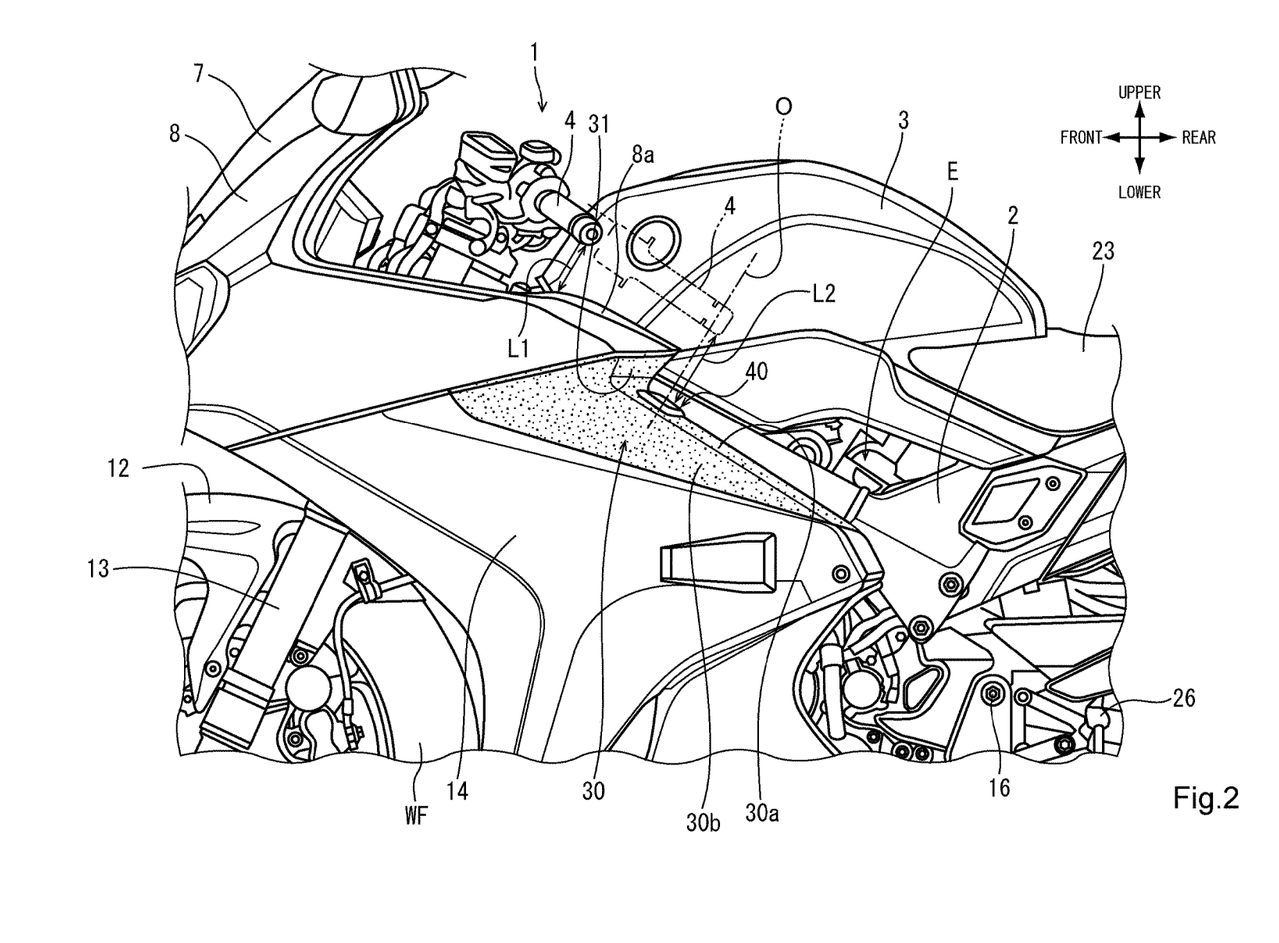
FIG. 2 is a partially enlarged view of FIG. 1.
Figure 3:
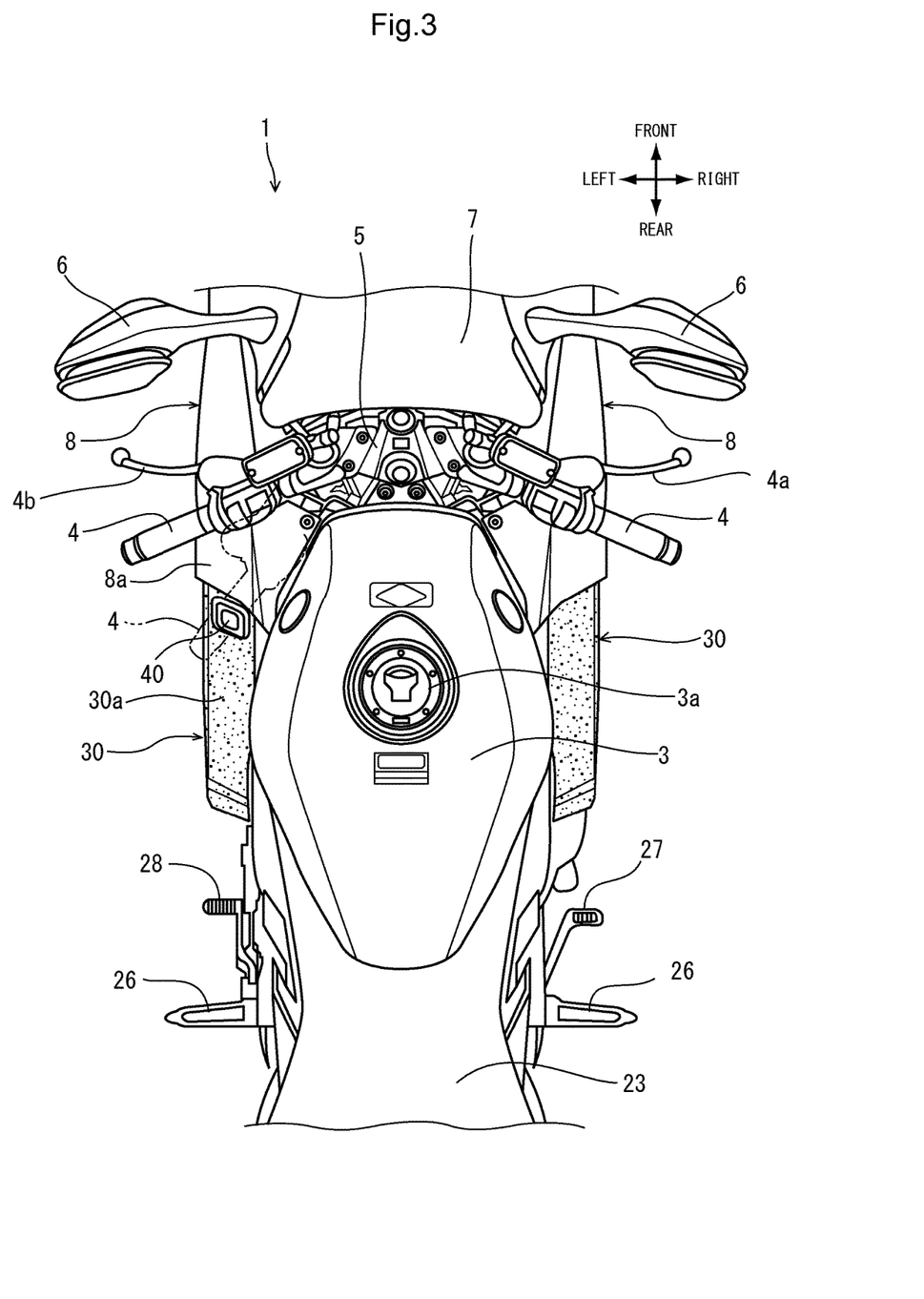
FIG. 3 is a partially enlarged plan view of the motorcycle.
Figure 4:
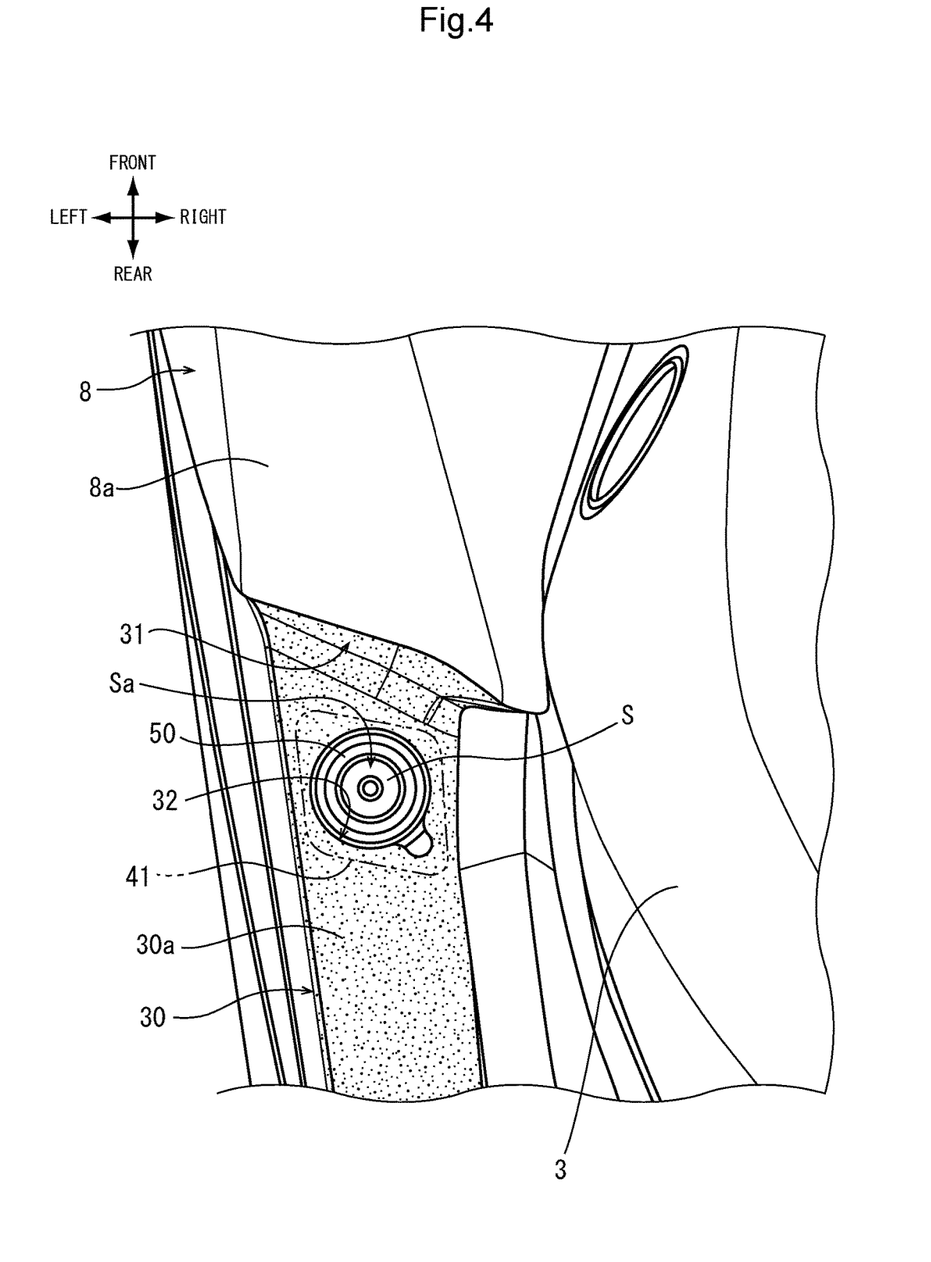
FIG. 4 is a partially enlarged view of FIG. 3

FIG. 2 is a partially enlarged view of FIG. 1. FIG. 3 is a partially enlarged plan view of the motorcycle 1. FIG. 4 is a partially enlarged view of FIG. 3. FIG. 4 illustrates a state where a lid portion 41 of an accessory socket S (hereinafter simply referred to as a socket S) has been removed for description.

The side cowl 30 is formed of, for example, a thin plate made of a synthetic resin. The side cowl 30 has a shape that fits into a large V-shaped slit that is oriented to a vehicle-body front side at an approximately center of the center cowl 14. The side cowl 30 has a top surface portion 30a and a side surface portion 30b. The top surface portion 30a is oriented to a vehicle-body upper side. The side surface portion 30b extends downward from an outer end portion in the vehicle width direction of the top surface portion 30a. A plug (not illustrated) at an electrical device side is inserted into the bottomed cylindrical socket S (see FIG. 5). The socket S is housed in an opening 32 formed at the top surface portion 30a of the side cowl 30.

A lid member 40 is mounted on the socket S. The lid member 40 is for covering an insertion port Sa of the plug. The lid member 40 is integrally made of a synthetic resin such as rubber. The lid member 40 has an open/close part that serves as a lid of the socket S. This open/close part has a diamond shape as seen in a plan view of the vehicle body.

An upright wall 31 is arranged upright toward the vehicle-body upper side. The upright wall 31 is disposed on a front end of the top surface portion 30a of the side cowl 30. The upright wall 31 slightly inclines to a vehicle-body rear side with respect to a vertical direction in side view of the vehicle body. Meanwhile, the cylindrical-shaped socket S has an axis O that also inclines to the vehicle-body rear side in side view of the vehicle body. The upright wall 31 and the axis O are approximately parallel.

Footrest steps 26 of a rider are supported to a rear portion of a plate member that presses a shaft of the pivot 16 from the outside in the vehicle width direction. A brake pedal 27 is arranged ahead of the footrest step 26 on the right side in the vehicle width direction. The brake pedal 27 manipulates a brake of the rear wheel. A shift pedal 28 is arranged ahead of the footrest step 26 on the left side.

A brake lever 4a is disposed on the right side of the steering handlebar 4. The brake lever 4a manipulates a brake of the front wheel. A clutch lever 4b is disposed on the left side of the steering handlebar 4. A fuel cap 3a is disposed on a top surface of the fuel tank 3. The fuel cap 3a is a hinge mechanism that is openable/closable.

As described above, the socket S and the lid member 40 are disposed on the top surface portion 30a of the side cowl 30 on the left side in the vehicle width direction. This will be an appropriate position for the rider of the motorcycle 1 to extend the left hand while straddling the seat 23 to access the socket S and the lid member 40. Further, with reference to FIG. 2, the socket S is disposed on a position rearward of a rear end of the steering handlebar 4, ahead of a front end of the seat 23, below an upper end of the seat 23, and above an upper end of the front wheel WF, in side view of the vehicle body. This ensures the accessory socket having usability even when the motorcycle 1 is stood in itself by the side kickstand 25 on the left side in the vehicle width direction.

With reference to FIG. 4, the upright wall 31 inclines such that an inside in the vehicle width direction of the upright wall 31 is positioned on the vehicle-body rear side, as seen in a plan view of the vehicle body. Meanwhile, the lid portion 41 of the lid member 40 is arranged such that two sides of the diamond shape are oriented in a vehicle-body front and rear direction, and one of acute angle parts of the diamond is positioned ahead of the outside in the vehicle width direction. Thus, two sides of the diamond that are oriented in the vehicle width direction are basically oriented along the upright wall 31. This can enhance merchantability of the accessory socket with unified designability without providing uncomfortable feeling in appearance, such as a circular lid portion.

The lid member 40 includes the diamond-shaped lid portion 41 and a fixed portion 50 for supporting the lid portion 41 to a side of the socket S. The insertion port Sa of the socket S is exposed outward from a center of the annular fixed portion 50.

As illustrated in FIG. 2, when the steering handlebar 4 is at a neutral position, a distance from the rear end of the steering handlebar 4 to a top surface portion 8a of the front cowl 8 will be a first distance L1. The top surface portion 8a of the front cowl 8 is positioned underneath the steering handlebar 4. Meanwhile, when the steering handlebar 4 is steered to a left limited position, a distance from the rear end of the steering handlebar 4 to the top surface portion 30a of the side cowl 30 will be a second distance L2. The top surface portion 30a of the side cowl 30 is positioned underneath the steering handlebar 4. Accordingly, a distance between the steering handlebar 4 and the lid member 40 increases. As illustrated in FIG. 3, when the vehicle body is supported by the side kickstand 25 disposed on the left side of the vehicle body, the steering handlebar 4 is often fully steered to the left side including in use of steering wheel lock. However, even in this case, the distance between the steering handlebar 4 and the lid member 40 is largely ensured. Thus, the operability on the lid member 40 is ensured without influence from the steering handlebar 4 to the access to the lid member 40. Furthermore, the rear end of the steering handlebar 4 is positioned above the lid member 40, thus ensuring protection of a lid part from a falling object and the like.

Figure 5:
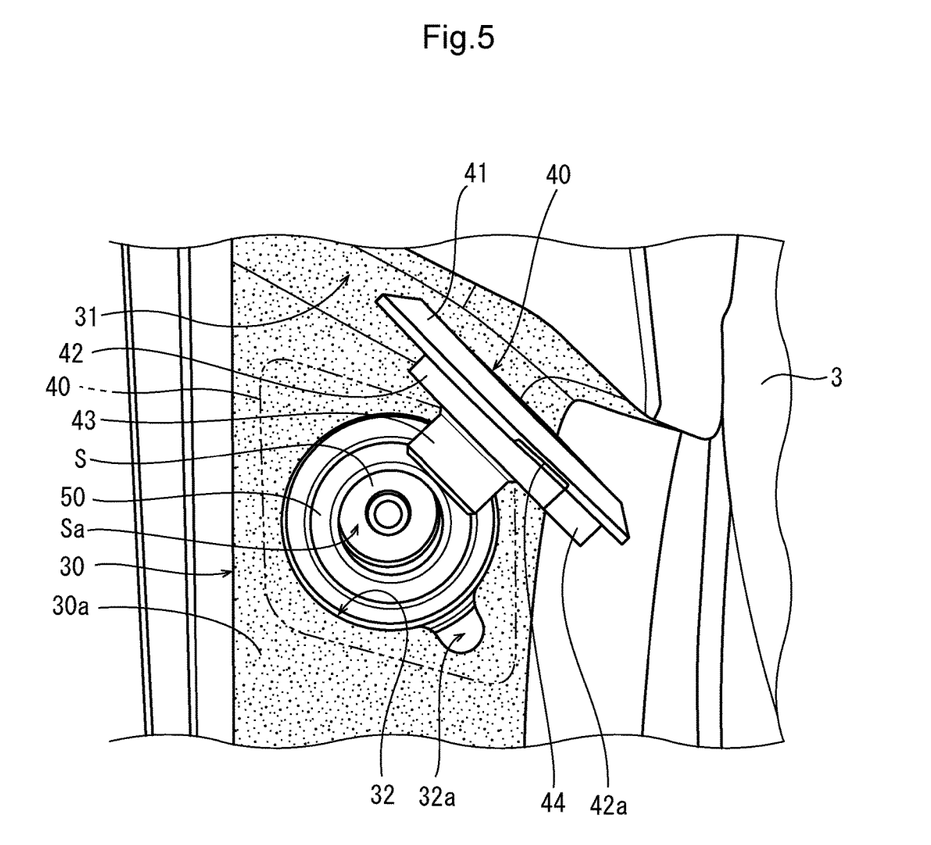
FIG. 5 is a plan view illustrating an open state of the accessory socket.
Figure 6:
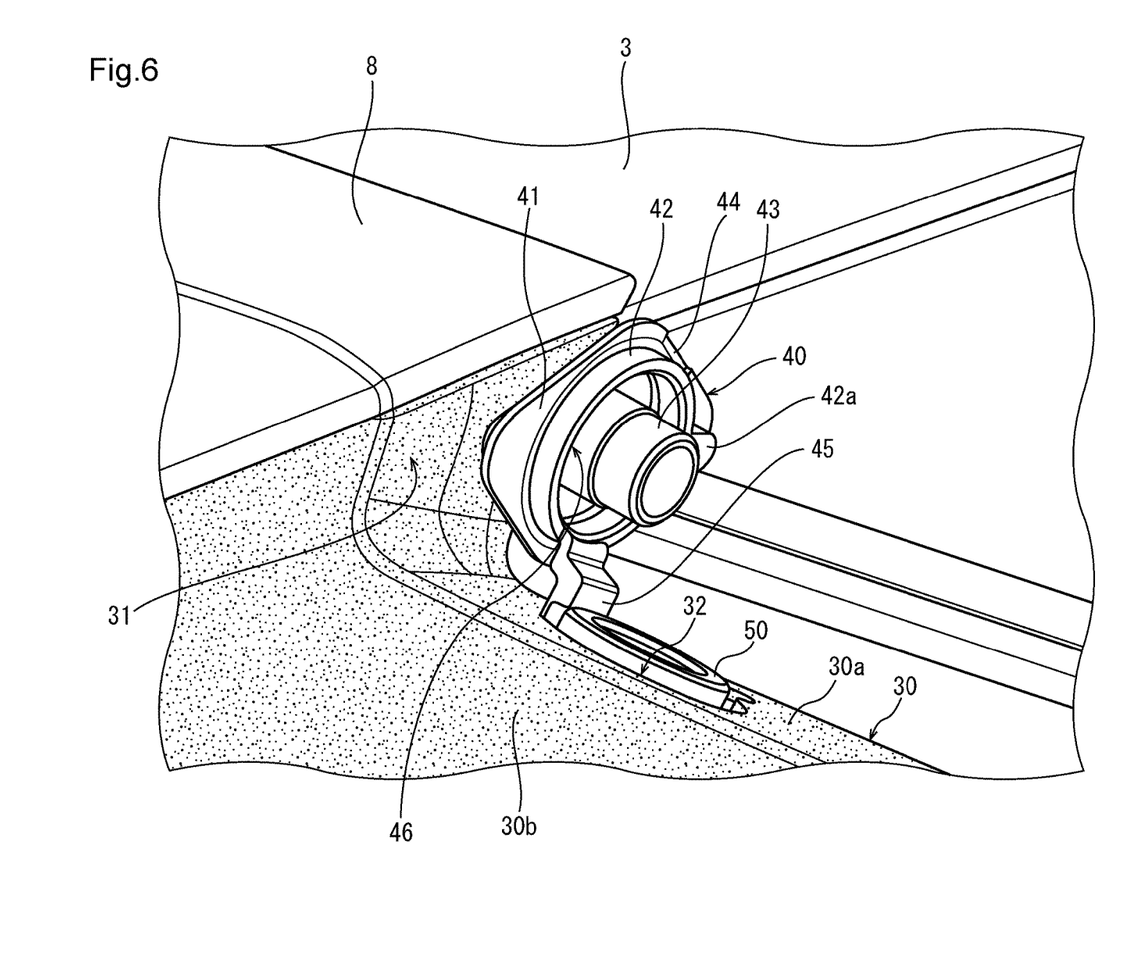
FIG. 6 is a perspective view illustrating the open state of the accessory socket.

FIG. 5 is a plan view illustrating an open state of the accessory socket S according to the embodiment. FIG. 6 is a perspective view illustrating the open state of the accessory socket S. The fixed portion 50 covered with the socket S has an upper end portion that slightly projects upward from the top surface portion 30a of the side cowl 30. The lid portion 41 of the lid member 40 is coupled to the fixed portion 50 via a coupling portion 45. The lid portion 41 includes a cylinder portion 43, an annular convex portion 42, an annular recess portion 46, and a positioning protrusion 42a. The cylinder portion 43 is inserted into the insertion port Sa of the socket S. The annular convex portion 42 has an outer diameter fitted into an inside of the lid portion 41. The annular recess portion 46 is formed between the cylinder portion 43 and the annular convex portion 42. The positioning protrusion 42a extends to an outside in a radial direction of the annular convex portion 42. Meanwhile, a cutout 32a is formed at the opening 32 disposed on the top surface portion 30a of the side cowl 30. The cutout 32a extends outside in the radial direction.

When the lid portion 41 is closed, the cylinder portion 43 of the lid portion 41 is inserted into the insertion port Sa of the socket S, and a top end surface of the fixed portion 50 is inserted into the annular recess portion 46, and the annular convex portion 42 is inserted into the opening 32 of the side cowl 30. This prevents moisture and the like from intruding into the socket S, and prevents moisture and the like from intruding into an inside of the side cowl 30 from the opening 32 of the side cowl 30.

When the lid portion 41 is closed, the positioning protrusion 42a of the lid portion 41 is engaged with the cutout 32a of the opening 32 to restrict rotating movement of the lid portion 41. This prevents the lid portion 41 from rotating when the lid portion 41 is closed, and ensures maintenance of a clearance between the lid portion 41 and the upright wall 31.

The lid portion 41 is arranged such that one of the acute angle parts of the diamond shape of the lid portion 41 is positioned at the front of the outside in the vehicle width direction. The coupling portion 45 is positioned at an obtuse angle part at the inside in the vehicle width direction of the diamond of the lid portion 41. The positioning protrusion 42a is positioned at the rear of the inside in the vehicle width direction. Accordingly, the lid portion 41 will be opened in a direction from a vehicle-body left rear side toward a vehicle-body right front side. Thus, lifting the lid portion 41 by hooking a finger to the outside in the vehicle width direction of the lid portion 41 ensures opening of the lid portion 41. Furthermore, in this embodiment, a recess portion 44 for hooking a nail or the like is formed at the proximity of the obtuse angle part at the outside in the vehicle width direction, thus further facilitating opening operation of the lid portion 41 by the left hand of the occupant.

The positioning protrusion 42a and the cutout 32a are formed in a direction different from an open and close direction of the lid portion 41. Thus, friction resistance is less likely to occur at a part of the positioning protrusion 42a in opening or closing of the lid portion 41 to improve the operability.

The lid portion 41 according to the embodiment is configured to stand in itself at an approximately perpendicularly opened position with respect to the top surface portion 30a of the side cowl 30 by abutting a rear portion of the coupling portion 45 on a front portion of the fixed portion 50. This eliminates the need that the occupant supports the lid portion 41 by hand when the plug at the electrical device side is inserted into the socket S, thus ensuring improvement of the usability of the accessory socket with a simple structure without increasing the number of components. The lid portion 41 in the open state does not approach the upright wall 31 to fall to the vehicle-body front side.

Figure 7:
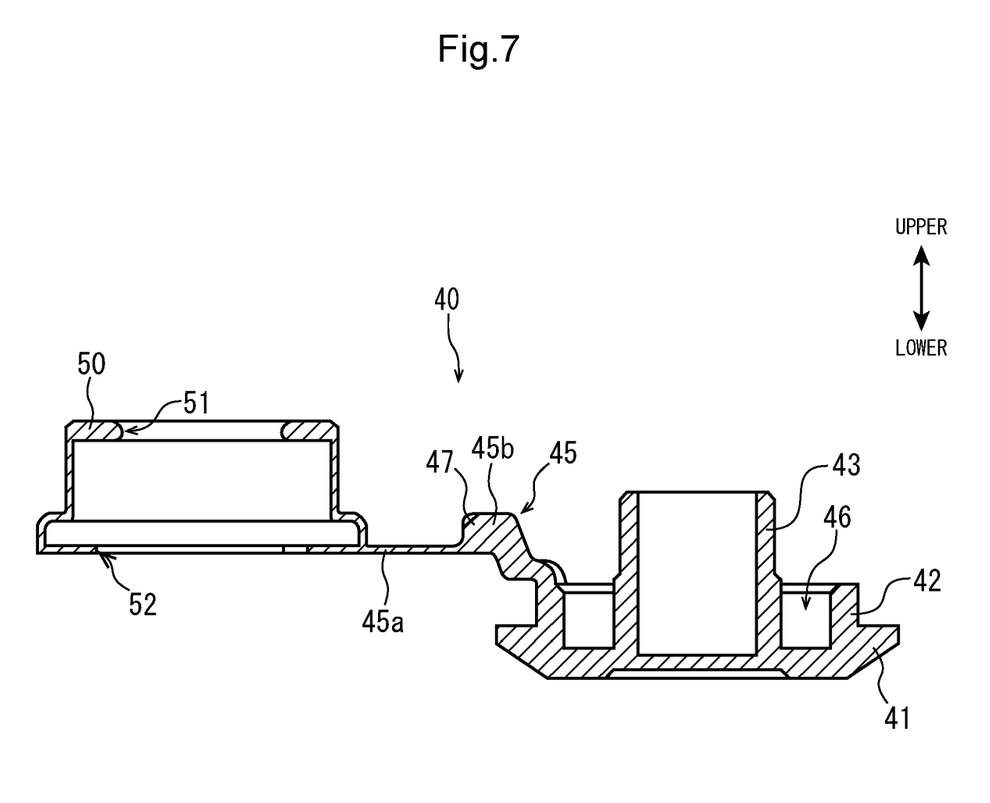
FIG. 7 is a cross-sectional view of the lid member.
Figure 8:
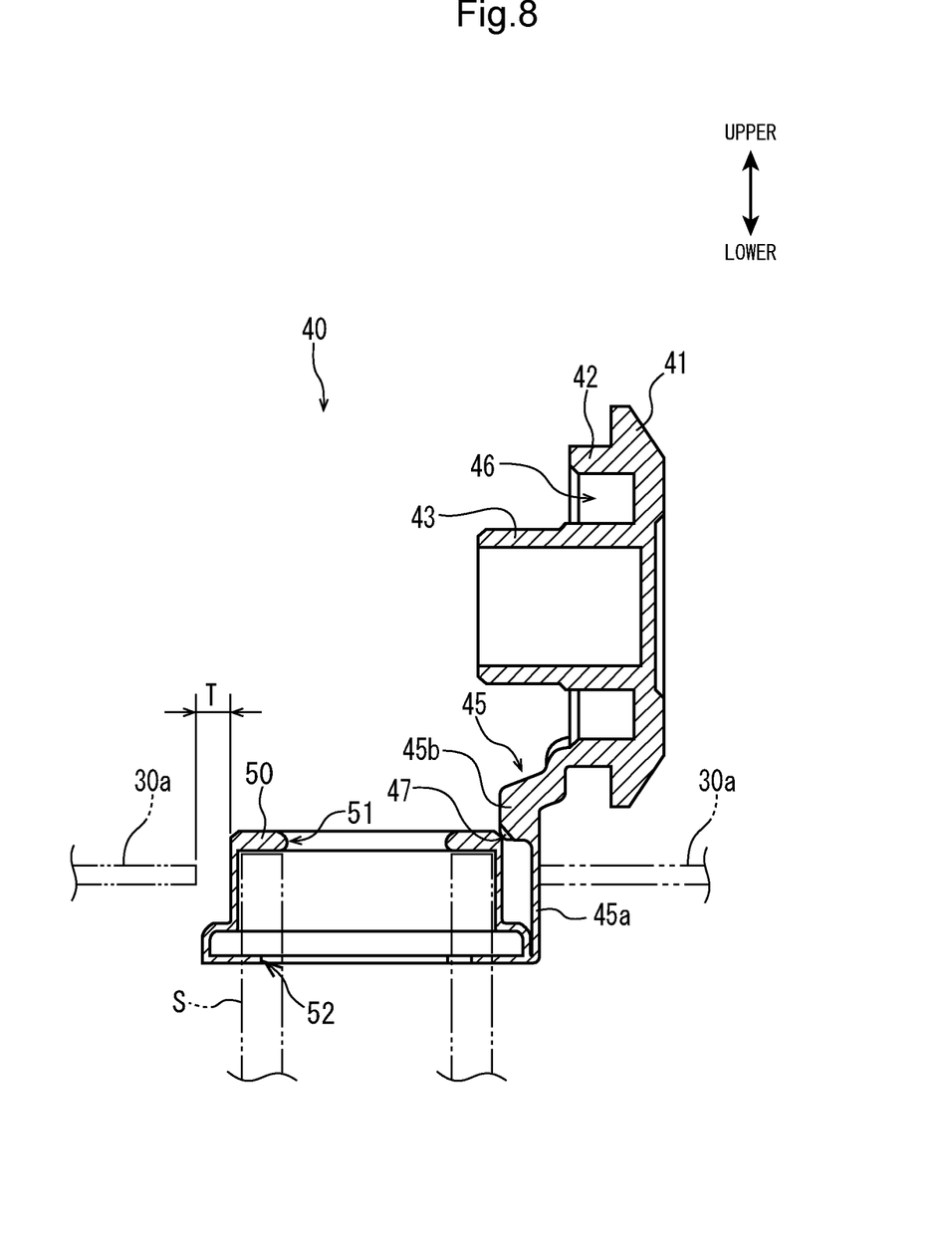
FIG. 8 is a cross-sectional view of the lid member (in an open state).
Figure 9:
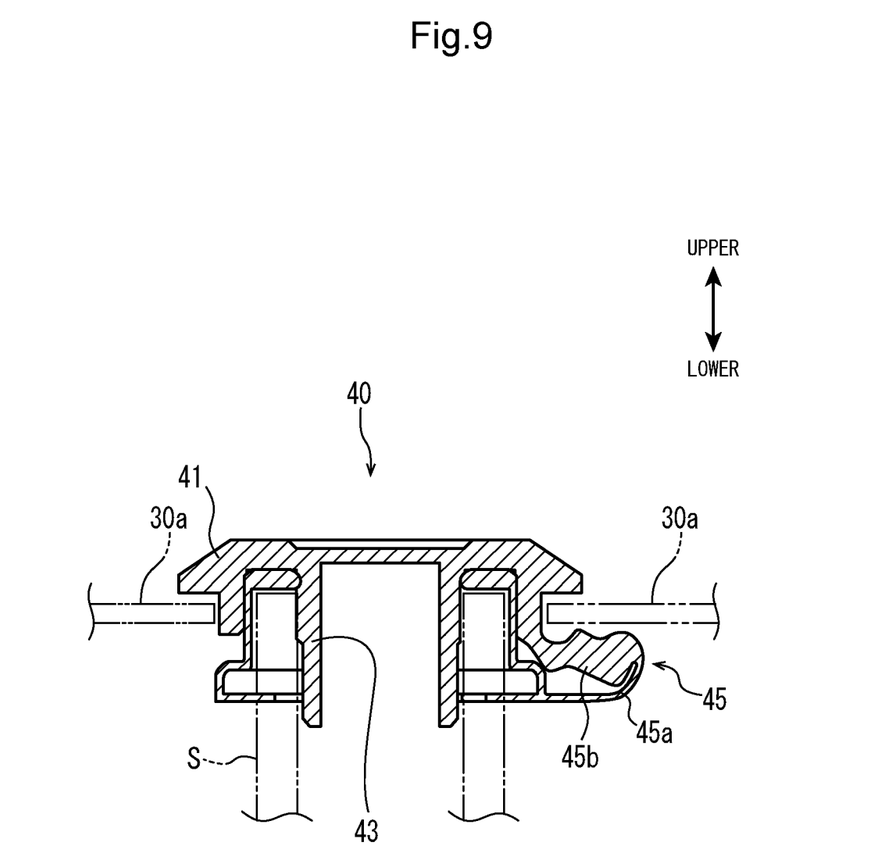
FIG. 9 is a cross-sectional view of the lid member (in a closed state).

FIGS. 7, 8, and 9 are cross-sectional views of the lid member 40. FIG. 7 illustrates a component itself. FIG. 8 illustrates the open state of the socket S when the lid member 40 is mounted on the vehicle body. FIG. 9 illustrates a closed state of the socket S when the lid member 40 is mounted on the vehicle body.

A predetermined clearance T is disposed between the opening 32 formed on the top surface portion 30a of the side cowl 30 and the fixed portion 50 covered with the socket S. The coupling portion 45 couples the lid portion 41 to the fixed portion 50. The coupling portion 45 is housed in a back surface side of the side cowl 30 in the closed state of the lid portion 41, and is extracted outward from the clearance T in the open state of the lid portion 41.

The fixed portion 50 has an upper side through hole 51 having a dimension adjusted to that of the insertion port Sa of the socket S. Meanwhile, the fixed portion 50 has a lower side through hole 52 configured to be smaller than an outer shape of the socket S, and to be fixedly fixed to the socket S with elastic force of the synthetic resin.

The coupling portion 45 of the lid member 40 has a sheet-shaped belt portion 45a and a supporting convex portion 45b that projects from this belt portion 45a in a direction of the fixed portion 50. In the open state of the lid portion 41, the belt portion 45a is extracted outward from the clearance T. In view of this, the supporting convex portion 45b has a thickness dimension having a size that can pass through the clearance T. Meanwhile, the lid member 40 is formed of an elastic body such as the rubber. Thus, even if the lid member 40 has a thickness approximately identical to that of the clearance T, the lid member 40 can pass through the clearance T. The supporting convex portion 45b abuts on an upper end outer periphery portion of the fixed portion 50 in the open state of the lid portion 41. A curved recess portion 47 is formed at the supporting convex portion 45b to stably support the lid portion 41. The curved recess portion 47 is curved to fit the upper end outer periphery portion of the fixed portion 50.

Then, as described above, when the lid portion 41 is closed, the cylinder portion 43 of the lid portion 41 is inserted into the insertion port Sa of the socket S, the top end surface of the fixed portion 50 is inserted into the annular recess portion 46, and the annular convex portion 42 is inserted into the opening 32 of the side cowl 30. This can prevent moisture and the like from intruding into the socket S, and can prevent moisture and the like from intruding into the inside of the side cowl 30 from the opening 32 of the side cowl 30.

Figure 10:
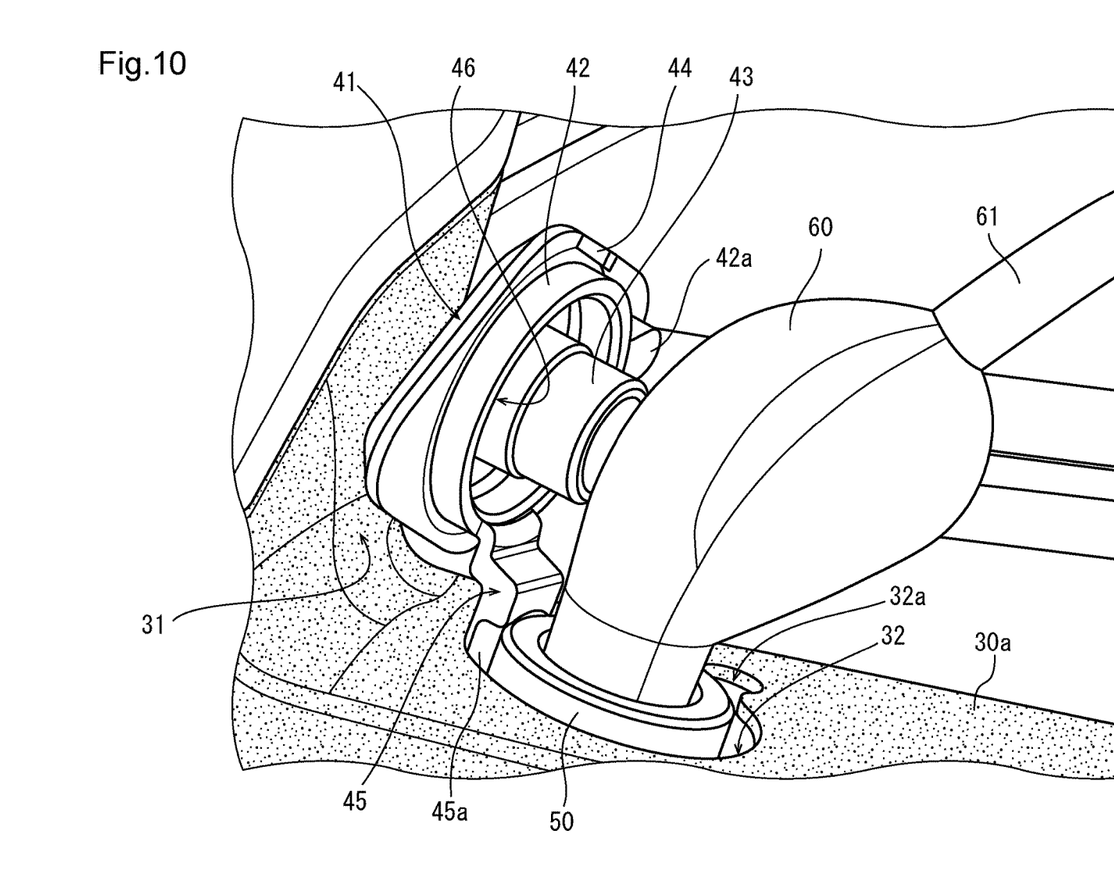
FIG. 10 is a perspective view illustrating a state where a plug of an electrical device is inserted into the socket.

FIG. 10 is a perspective view illustrating a state where a plug 60 of an electrical device is inserted into the socket S. When the plug 60 to which a wiring 61 of the electrical device is coupled is inserted in the open state of the lid portion 41, the lid portion 41 will be positioned between the plug 60 and the upright wall 31. This causes the lid portion 41 to less likely to be shaken even if vibration in travelling is applied, thus ensuring a stable use.

With the above-described configuration, according to the accessory socket structure of the saddled vehicle according to the embodiment, the socket S has the end portion at the side of the insertion port Sa, the end portion having the predetermined clearance T with an inner peripheral portion of the opening 32 to be inserted into the opening 32 from the vehicle-body lower side toward the vehicle-body upper side, the lid member 40 includes the fixed portion 50, the coupling portion 45, and the lid portion 41, the fixed portion 50 being covered at the end portion at the insertion port Sa side of the socket S, the coupling portion 45 being integrally formed with the fixed portion 50, and the lid portion 41 being integrally formed with the coupling portion 45 to cover the insertion port Sa of the socket S, the coupling portion 45 includes the supporting convex portion 45b having the thickness such that the supporting convex portion 45b can pass through the clearance T, and the supporting convex portion 45b is configured to abut on the fixed portion 50 when the lid portion 41 is opened, to maintain the open state of the lid portion 41. This can maintain the open state of the lid portion 41 by the supporting convex portion 45b formed on the coupling portion 45 to eliminate the need for the user to support the lid portion 41 by hand when inserting the plug at the electrical device side into the socket S, thus ensuring improvement of the usability of the accessory socket with the simple structure without increasing the number of components.

Note that, the dimension of the socket, the materials and the shapes of the side cowl and the lid member, the shapes of the lid portion and the coupling portion of the lid member, the size of the clearance between the opening and the fixed portion, and a similar specification are not limited to the above-described embodiments, and various modifications are possible. For example, the socket may be disposed on the side cowl on the right side of the vehicle body. The accessory socket structure according to the present invention is not limited to a motorcycle but is applicable to various vehicles and similar device such as saddled three/four-wheeled vehicles.

REFERENCE SIGNS LIST

1 . . . motorcycle (saddled vehicle),
2 . . . body frame,
3 . . . fuel tank,
8 . . . front cowl (exterior component),
8a . . . top surface portion,
14 . . . center cowl,
30 . . . side cowl (exterior component), 30a . . . top surface portion,
30b . . . side surface portion,
32 . . . opening,
32a . . . cutout,
40 . . . lid member,
41 . . . lid portion,
42a . . . positioning protrusion,
45 . . . coupling portion,
45a . . . belt portion,
45b . . . supporting convex portion,
S . . . socket

What is claimed is:

1. An accessory socket structure of a saddled vehicle, the accessory socket structure having a bottomed cylindrical socket and a lid member disposed on an opening, the socket having an insertion port for inserting a plug at an electrical device side, the lid member being mounted on the socket for covering the insertion port, and the opening being disposed on an exterior component of a saddled vehicle,
wherein the socket has an end portion at a side of the insertion port, the end portion having a predetermined clearance with an inner peripheral portion of the opening to be inserted into the opening from a vehicle-body lower side toward a vehicle-body upper side,
the lid member includes a fixed portion, a coupling portion, and a lid portion, the fixed portion being covered at the end portion at the insertion port side of the socket, the coupling portion being integrally formed with the fixed portion, and the lid portion being integrally formed with the coupling portion to cover the insertion port of the socket,
the coupling portion includes a supporting convex portion having a thickness such that the supporting convex portion can pass through the clearance, and
the supporting convex portion is configured to abut on the fixed portion when the lid portion is opened, to maintain an open state of the lid portion.

2. The accessory socket structure of the saddled vehicle according to claim 1,
wherein the socket has an axis arranged to incline rearward with respect to a vehicle-body vertical direction, and
the coupling portion is disposed at a position near a vehicle-body front side.

3. The accessory socket structure of the saddled vehicle according to claim 2,
wherein the exterior component is a side cowl positioned at an outside in a vehicle width direction of a fuel tank,
the side cowl includes an upright wall arranged upright at a position at the vehicle-body front side of the opening, and
the upright wall is formed approximately parallel to the axis of the socket.

4. The accessory socket structure of the saddled vehicle according to claim 3,
wherein the side cowl has a top surface portion having a predetermined width in the vehicle width direction to incline to a vehicle-body rear and lower side,
the opening is disposed at the top surface portion and has a cutout that extends outside in a radial direction of a circular part, the socket being inserted into the circular part,
the lid portion is formed into a diamond whose two sides are oriented in a vehicle-body front and rear direction when the vehicle body is seen in a plan view, and
the diamond of the lid portion has an acute angle part having a lower surface, the lower surface including a positioning protrusion engaged with the cutout.

5. The accessory socket structure of the saddled vehicle according to claim 4,
wherein the lid portion is arranged such that one of the acute angle parts of the diamond is positioned at a front of an outside in the vehicle width direction,
the coupling portion is positioned at an obtuse angle part at an inside in the vehicle width direction of the diamond of the lid portion, and
the positioning protrusion is positioned at a rear of the inside in the vehicle width direction.

6. The accessory socket structure of the saddled vehicle according to claim 1,
wherein a side kickstand is disposed at a left side in the vehicle width direction of the saddled vehicle, and
the opening is disposed at the side cowl on the left side in the vehicle width direction.

7. The accessory socket structure of the saddled vehicle according to claim 2,
wherein a side kickstand is disposed at a left side in the vehicle width direction of the saddled vehicle, and
the opening is disposed at the side cowl on the left side in the vehicle width direction.

8. The accessory socket structure of the saddled vehicle according to claim 3,
wherein a side kickstand is disposed at a left side in the vehicle width direction of the saddled vehicle, and
the opening is disposed at the side cowl on the left side in the vehicle width direction.

9. The accessory socket structure of the saddled vehicle according to claim 4,
wherein a side kickstand is disposed at a left side in the vehicle width direction of the saddled vehicle, and
the opening is disposed at the side cowl on the left side in the vehicle width direction.

10. The accessory socket structure of the saddled vehicle according to claim 5,
wherein a side kickstand is disposed at a left side in the vehicle width direction of the saddled vehicle, and
the opening is disposed at the side cowl on the left side in the vehicle width direction.

11. An accessory socket structure of a saddled vehicle, the accessory socket structure comprising a bottomed cylindrical socket and a lid member, the socket having an insertion port of a plug at an electrical device side, and the lid member being mounted on the socket to cover the insertion port,
wherein a side cowl is disposed on a left side in a vehicle width direction of the saddled vehicle, the side cowl covering a side kickstand and a side portion of a fuel tank,
when a steering handlebar of the saddled vehicle is at a neutral position, the socket is disposed on the side cowl at a position rearward of a rear end of the steering handlebar, ahead of a front end of a seat, below an upper end of the seat, and upward of an upper end of a front wheel when the vehicle body is viewed from the side.

12. The accessory socket structure of the saddled vehicle according to claim 11,
wherein the side cowl includes a top surface portion and a side surface portion, the top surface portion extending in the vehicle width direction, and the side surface portion extending downward from an outer end portion in the vehicle width direction of the top surface portion, the socket is disposed on an opening disposed at the top surface portion to be covered with the side surface portion at a side portion, and the lid member is configured to simultaneously cover the insertion port and the opening.

13. The accessory socket structure of the saddled vehicle according to claim 11, wherein a second distance is larger than a first distance, the first distance being from a rear end of the steering handlebar to a top surface portion of an exterior component positioned underneath the steering handlebar, the first distance being established when the steering handlebar is at a neutral position, and the second distance being from the rear end of the steering handlebar to a top surface portion of an exterior component positioned underneath the steering handlebar, the second distance being established when the steering handlebar is steered to a left limited position.

14. The accessory socket structure of the saddled vehicle according to claim 12, wherein a second distance is larger than a first distance, the first distance being from a rear end of the steering handlebar to a top surface portion of an exterior component positioned underneath the steering handlebar, the first distance being established when the steering handlebar is at a neutral position, and the second distance being from the rear end of the steering handlebar to a top surface portion of an exterior component positioned underneath the steering handlebar, the second distance being established when the steering handlebar is steered to a left limited position.

* * * * *